United States Patent [19]
Beck et al.

[11] Patent Number: 5,931,057
[45] Date of Patent: Aug. 3, 1999

[54] APPARATUS FOR STRAIGHTENING LONG SAW BLADES, ESPECIALLY FOR BAND SAWS

[75] Inventors: Ernst Beck, Maselheim; Peter Lenard, Biberach, both of Germany

[73] Assignee: Vollmer Werke Maschinenfabrik GmbH, Riss, Germany

[21] Appl. No.: 08/983,202

[22] PCT Filed: Jun. 3, 1997

[86] PCT No.: PCT/EP97/02882

§ 371 Date: Jan. 13, 1998

§ 102(e) Date: Jan. 13, 1998

[87] PCT Pub. No.: WO97/46335

PCT Pub. Date: Dec. 11, 1997

[30] Foreign Application Priority Data

Jun. 4, 1996 [DE] Germany ............................ 196 22 428

[51] Int. Cl.⁶ .............................. B23D 63/18; B21D 1/02
[52] U.S. Cl. ................................................. 76/27; 76/25.1
[58] Field of Search ......................... 76/27, 25.1; 72/179

[56] References Cited

U.S. PATENT DOCUMENTS

| 971,841 | 10/1910 | Hibbert et al. | 76/27 |
| 2,623,414 | 12/1952 | Senard | 76/27 |
| 3,919,900 | 11/1975 | Allen et al. | 76/27 |
| 4,852,430 | 8/1989 | Oppliger et al. | 76/27 |

FOREIGN PATENT DOCUMENTS

| 342 385 B1 | 3/1978 | Austria . | |
| 1017277 | 12/1952 | France | 76/27 |
| 3313160 | 7/1984 | Germany | 76/27 |
| 4214 784 | 11/1992 | Germany . | |
| WO 96/36453 | 11/1996 | WIPO . | |

Primary Examiner—Hwei-Siu Payer
Attorney, Agent, or Firm—Clifford W. Browning; Woodard, Emharddt, Naughton, Moriarty & McNett

[57] ABSTRACT

A machine table (16) on which a saw blade (10) is movable in a direction of movement (A) which essentially conforms to the longitudinal extension of the saw blade is provided with a first measuring station (22) for measuring the saw blade (10) in a measuring plane (B) perpendicular to the direction of movement (A) thereof. The machine table (16) furthermore supports a second measuring station (28) for scanning an edge (14) of the saw blade (10) in the plane thereof transversely of the direction of movement (A) as well as a rolling station (26) which comprises first and second rollers (34, 36) for changing the tension profile of the saw blade (10) and the curvature of the edge (14) thereof. The second roller (36) is pivotably adjustable with respect to the first roller (34) about a pivot axis (C) which intersects the axes of rotation (D1, D2) of the two rollers (34, 36) approximately at right angles and thereby adapted to be positioned obliquely for correcting distortions of the saw blade (10). Independently thereof, the two rollers (34, 36) are pivotably adjustable in common about the pivot axis (C) mentioned and thus adapted to be positioned obliquely in accordance with the measuring data supplied by the second measuring station (28) in order to correct deviations of the saw blade (10) from the envisaged direction of movement (A).

4 Claims, 5 Drawing Sheets

APPARATUS FOR STRAIGHTENING LONG SAW BLADES, ESPECIALLY FOR BAND SAWS

The invention relates to a saw straightening apparatus.

A known apparatus of this kind (DE 42 14 784 A1) comprises a machine table arranged between two return pulleys around which a saw blade is moved. In the direction of movement of the saw blade, a plurality of successive measuring stations are disposed on the machine table, namely a station to measure the tension profile, a station to measure the curvature, a station to measure the distance, and a station to measure bulges and indentations. The latter is followed by a processing unit which comprises a plurality of roller pairs, namely one pair to smooth bulges, one to level indentations, and one to correct the tension profile and back curvature of the saw blade. The latter pair of rollers is composed of an upper roller supported on the upper leg of a C-shaped roller stand and adapted to be pressed in downward direction by an hydraulic piston and cylinder unit against the saw blade which passes horizontally between the rollers, and a lower roller on which the saw blade rests. The lower roller is supported in a swivel means carried by the lower leg of the C-shaped roller stand and pivotable about a vertical pivot axis. The pivot axis intersects the axis of rotation of the lower roller at right angles and is located at a considerable distance from the rolling surface of the roller. A pair each of transverse stabilizing rollers are arranged upstream and downstream of the processing unit made up of the three rollers pairs mentioned. The axes of the stabilizing rollers extend slightly obliquely with respect to the transverse direction which is at right angles to the intended direction of movement of the saw blade so that the back of the saw blade is kept in constant engagement with longitudinal guide means. The pressure exerted by each pair of stabilizing rollers is adjustable by means of an hydraulic cylinder each. The longitudinal guide means for the back of the saw blade are designed to act as curvature measuring station.

The back of the blade in the present context and below is meant to define the edge remote from the teeth of a saw blade formed with teeth along one side only. Yet this is not intended to exclude—at least not in conjunction with the instant invention—saw blades with serrations along both sides for band saws and gang saws as well. With such saw blades, it is one of the two serrated edges instead of a smooth tooth back which is scanned to see if and how the saw blade is buckled in its plane and whether it deviates from the envisaged direction of movement.

The causes bringing about the tension profile and the principles of correcting it by rolling are known; reference is made in this respect to AT 342 385 B1 in addition to DE 42 14 784 A1 already mentioned above.

It is the object of the invention to develop an apparatus of the kind in question such that the aims indicated will be accomplished in a simpler and particularly reliable manner, namely the rolling aimed at correcting the tension profile and the back curvature and also at removing distortions of the saw blade as well as the transverse stabilization of the saw blade as a prerequisite for correctly carrying out the operations mentioned.

According to the invention, all the aims listed are accomplished by the rolling station which, as usual, need only comprise one pair of rollers.

Advantageous further developments of the invention are presented in the subclaims.

An embodiment of the invention will be described in greater detail below, with reference to diagrammatic drawings, in which.

Figure 1:
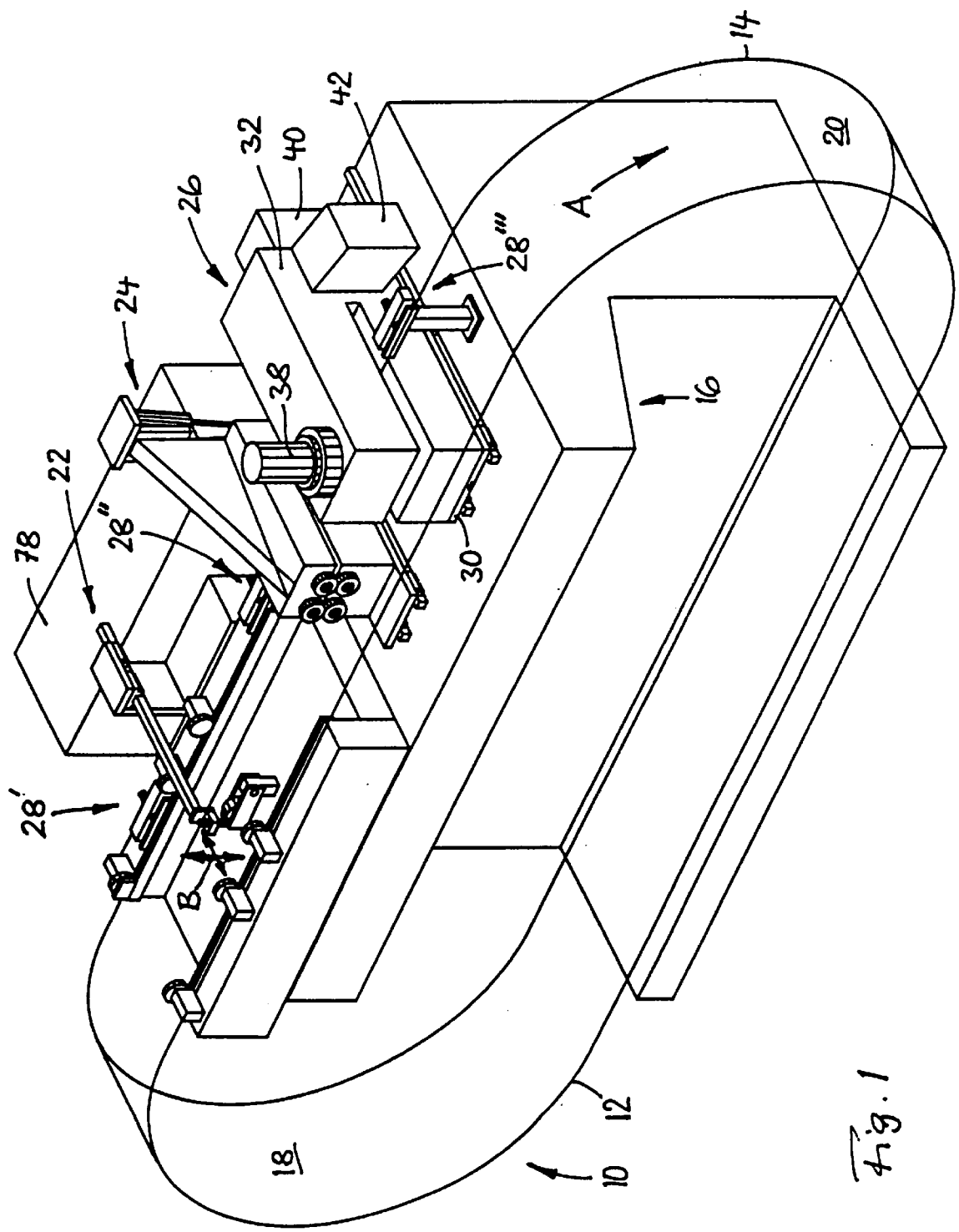
FIG. 1 is an oblique view of an apparatus according to the invention comprising a plurality of stations, among them a rolling station for advancing saw blades and for correcting the tension profile and the back curvature as well as for removing distortions from the saw blades.
Figure 2:
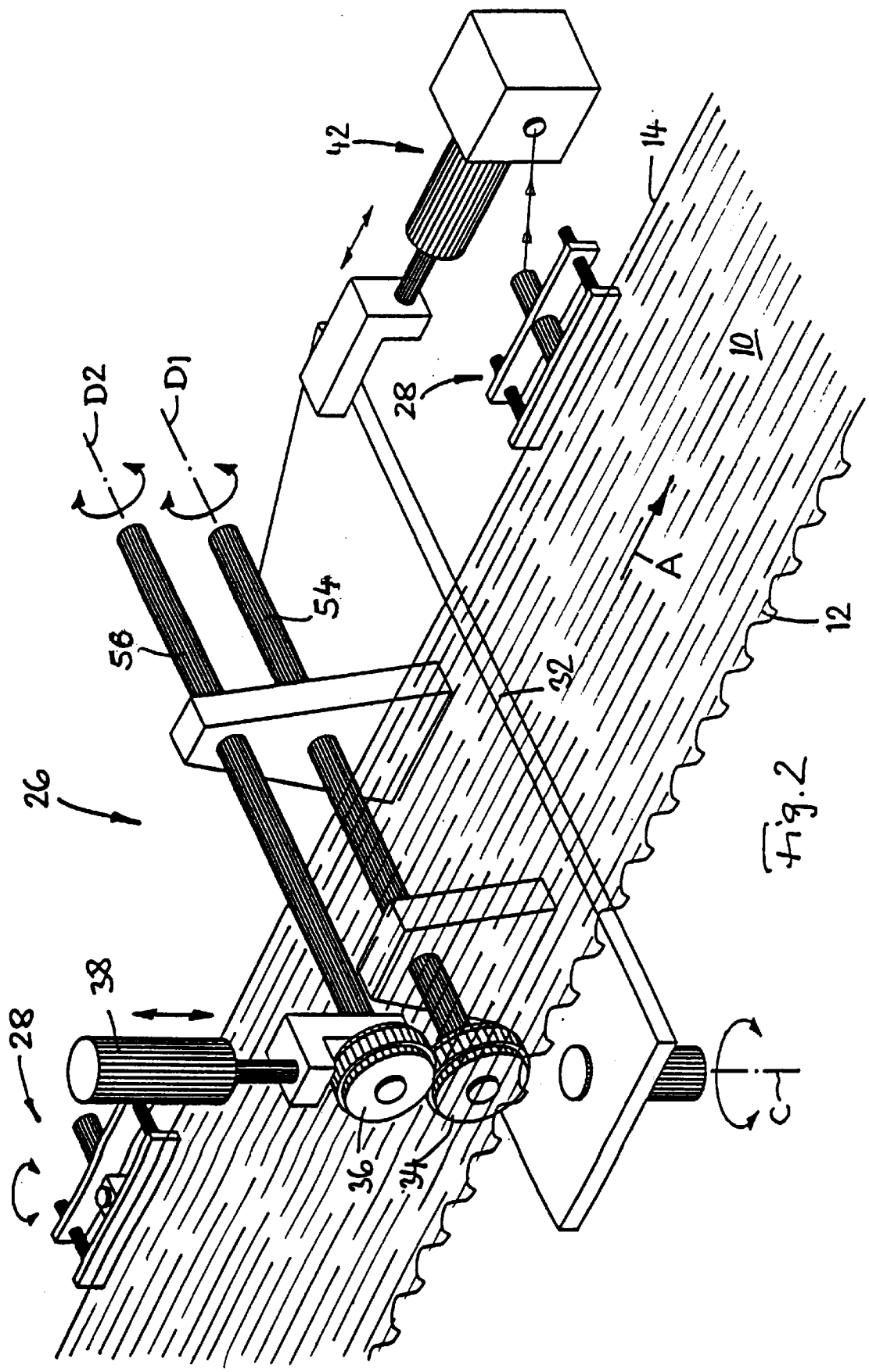
FIG. 2 is an enlarged, even more schematic oblique view of the rolling station.

The machine shown is devised for automatically straightening elongate saw blades 10. In FIGS. 1 and 2 an endless saw blade is indicated with teeth 12 formed along one longitudinal side and a smooth edge 14, usually referred to as back of the blade at the opposite longitudinal side. It is likewise possible to process endless saw blades with serrations along both sides and also gang saw blades.

The machine comprises an oblong machine table 16 on which a saw blade 10 is placed in such manner that it will form approximately semicircular arcs 18 and 20, respectively, behind and in front of the table 16. The saw blade 10 is moved, in the direction of arrow A in FIGS. 1 and 2, through a plurality of stations provided on the machine table 16, namely a measuring station 22 which scans the surface of the saw blade 10 in vertical direction in a vertical measuring plane B, a levelling station 24 for smoothing bulges and indentations in the saw blade 10, a rolling station 26 by means of which the saw blade 10 can be driven and be given a desired tension profile and a desired back curvature, and at least one measuring station 28 which scans the back 14 of the blade 10 in horizontal direction transversely of the direction of movement A. In the embodiment shown, three measuring stations 28', 28" and 28'" are distributed along the entire length of the machine table 16 to scan the back 14 of the blade 10. As the measuring station 22, the levelling station 24, and the measuring stations 28', 28" and 28'" may be of any suitable known design they will not be described in greater detail. The saw blade 10 also may be moved contrary to the direction of arrow A.

The rolling station 26 comprises a base structure 30 guided on the machine table 16 for displacement in horizontal direction, transversely of the direction of movement A. The base structure 30 carries a roller stand 32 which is C-shaped, when viewed from the side, and can swing around a vertical pivot axis C. The roller stand 32 supports a first, lower roller 34 and a second, upper roller 36 for rotation about approximately parallel, approximately horizontal axes of rotation D1 and D2, respectively. The second roller 36 is adapted to be pressed by a contact pressure means 38, such as an hydraulic piston and cylinder unit against the saw blade 10 resting on the first roller 34. The pivot axis C intersects both axes of rotation D1 and D2 at approximately right angles and extends through those locations where the rollers 34 and 36 contact the saw blade 10. In other words, a diameter each of the two rollers 34 and 36 lies on the pivot axis C. The rolling station 26 is equipped with a motor means 40 to drive the rollers 34 and 36.

The rolling station 26 further comprises an indexing drive means 42, such as a servo motor by means of which the roller stand 32 can be pivoted about the pivot axis C and thus be positioned obliquely in controlled fashion, departing from its central position, so that the back or edge 14 of the saw blade 10 will move along the third one 28'" of the three associated measuring stations 28', 28" and 28'" within a given range of tolerance. The central position is to be understood as that position of the roller stand 32 at which the first roller 34 and, at least approximately, also the second roller 36 move in longitudinal direction of the machine table 16. In general, it will be sufficient to swing the roller stand 32 by less than 1° to one or the other side from its central position in order to make sure that the back 14 of the blade 10 will move along the third measuring station 28'". As a matter of precaution, however, the maximum pivot range of the roller stand 32 is approximately 3° towards each side, i.e. a total of about 6°.

Figure 3:
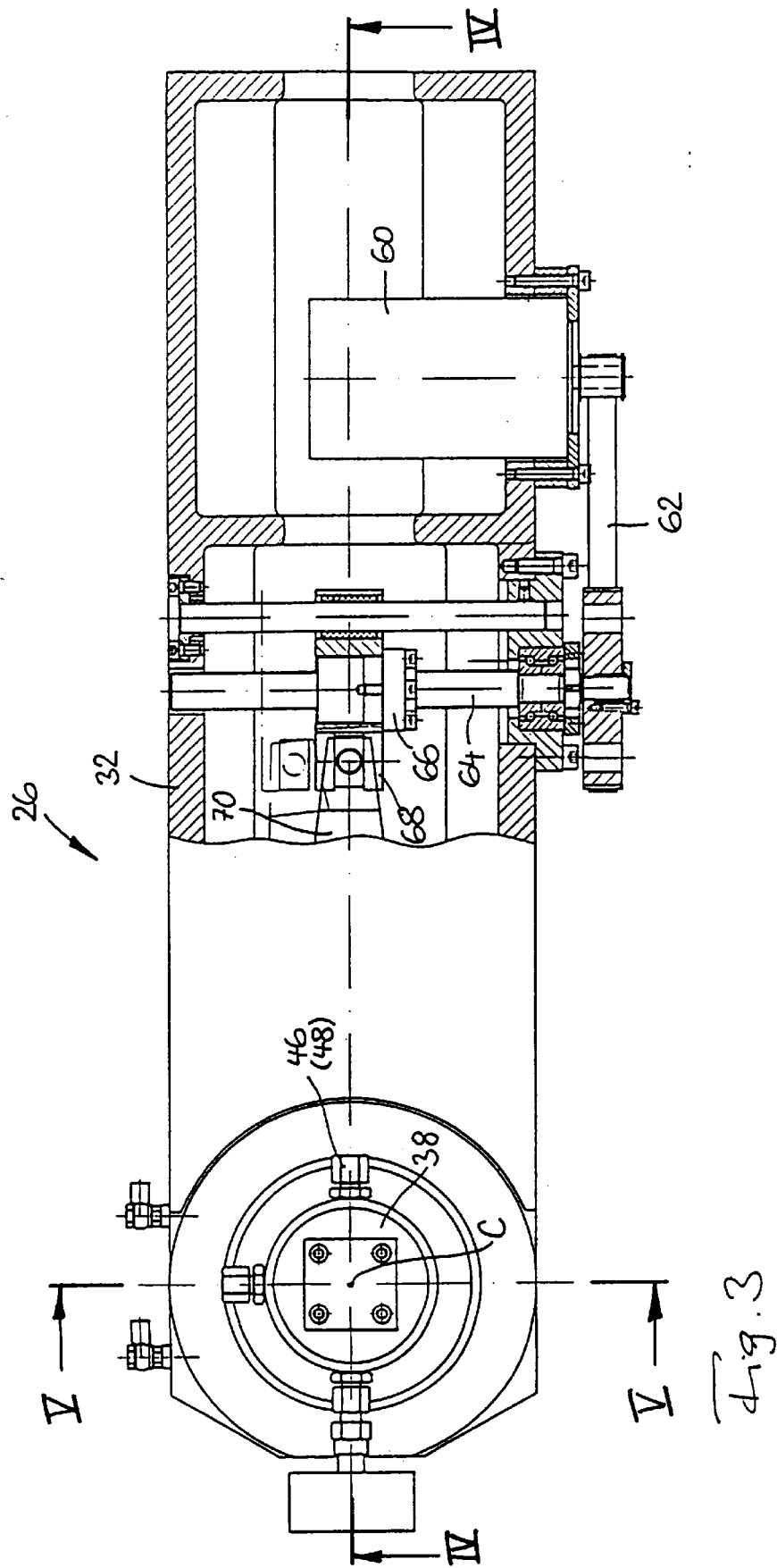
FIG. 3 shows the top plan view of the rolling station, partly in section III—III of FIG. 4.
Figure 4:
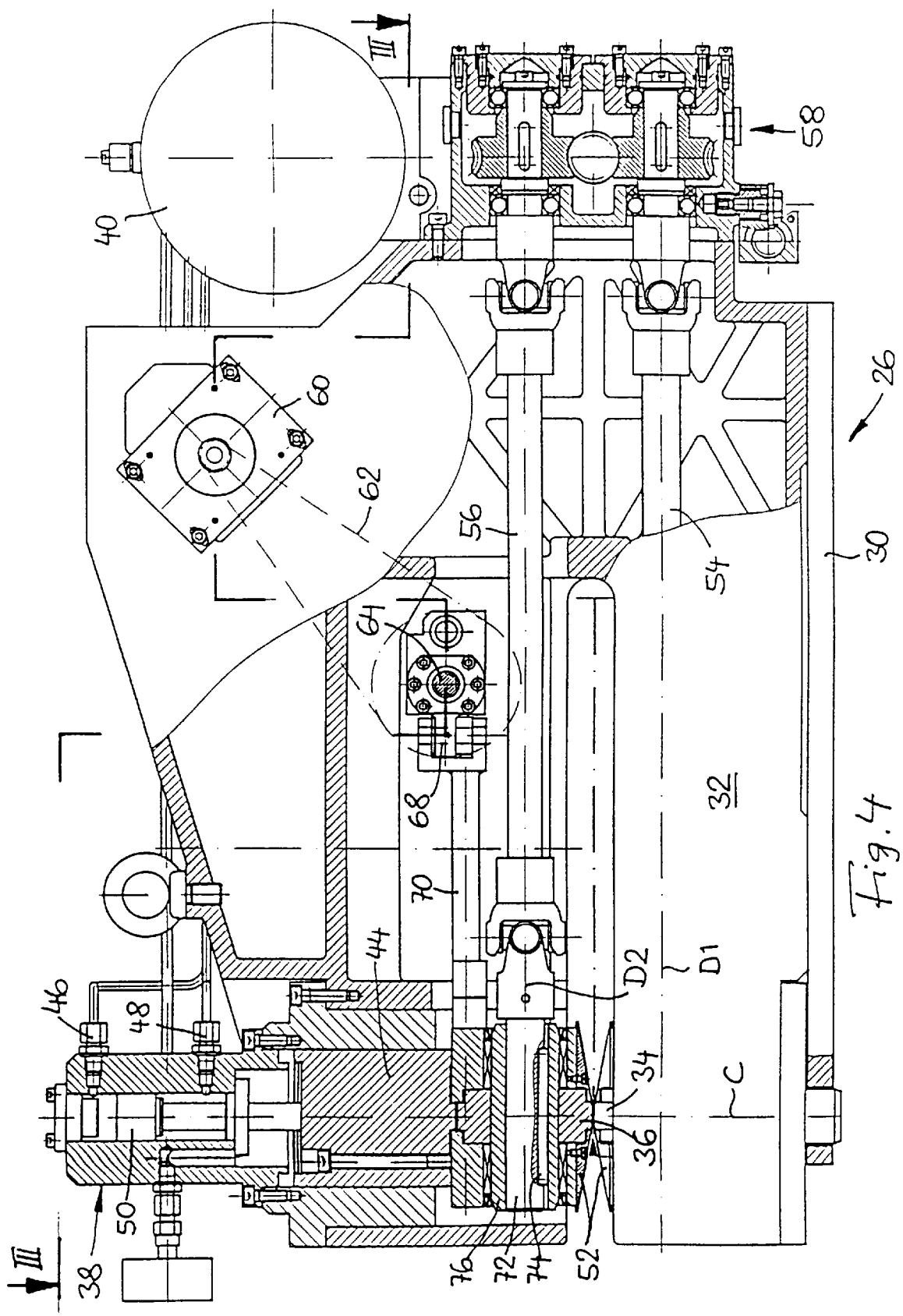
FIG. 4 is a side elevation of the rolling station, partly in section IV—IV of FIG. 3.
Figure 5:
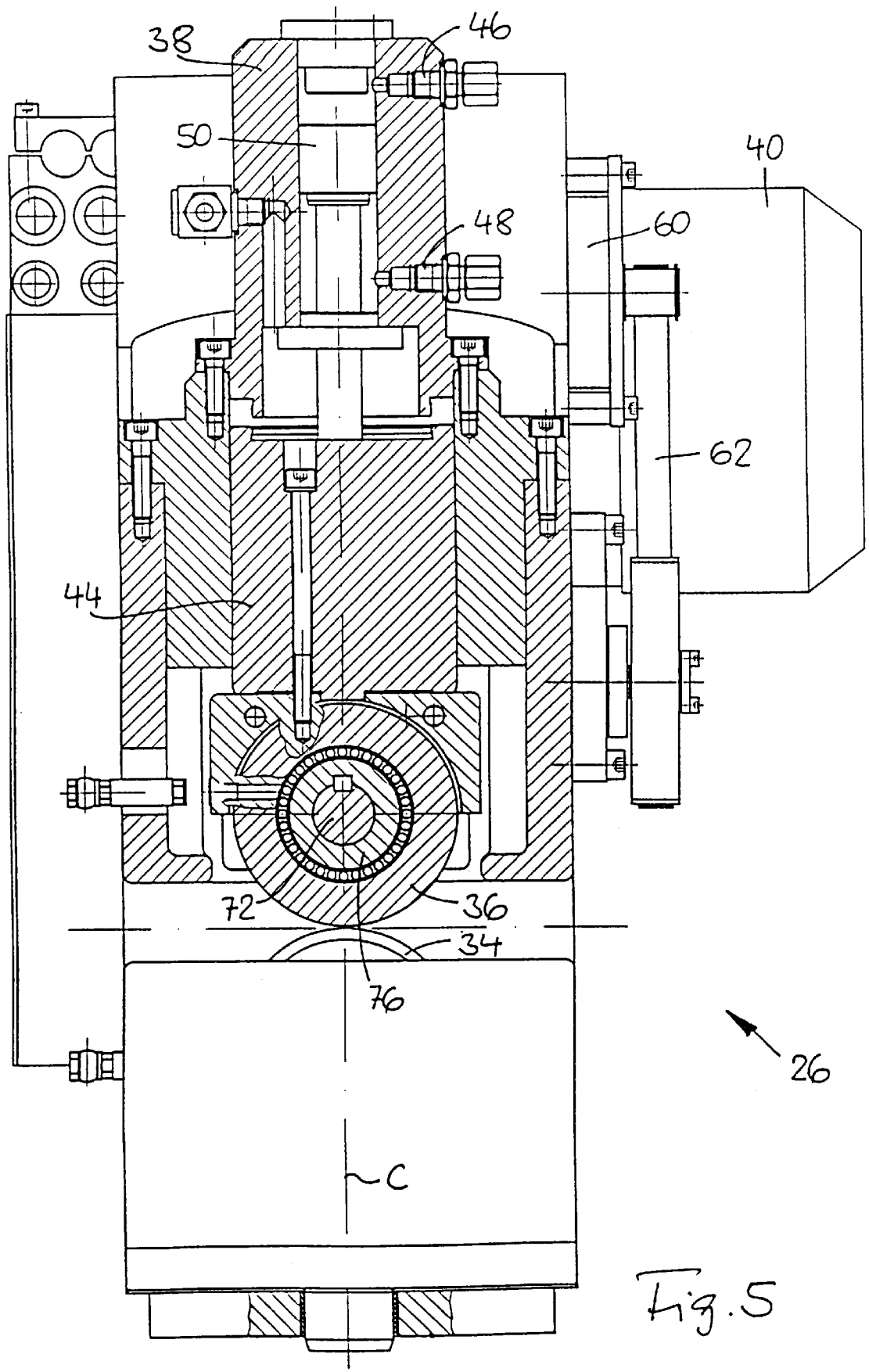
FIG. 5 is the sectional elevation V—V of FIG. 3.

The details described above of the rolling station 26 may be seen in FIGS. 1 and 2. Further details illustrated in FIGS. 3 to 5 will be described below:

The first roller 34 is supported by conventional slide bearings or roller bearings in invariable position with respect to the roller stand 32. The second roller 36, on the other hand, is supported by a bearing body 44 which is pivotably adjustable about the pivot axis C and guided by the contact pressure means 38 in the roller stand 32 for advancement along the pivot axis C. The piston and cylinder unit provided as the contact pressure means 38 is double acting in the embodiment illustrated. It has an upper inlet 46 and a lower inlet 48 for pressure fluid acting on a piston 50 to which the bearing body 44 is firmly connected. Consequently, for rolling, the second roller 36 can be pressed downwards at adjustable pressure, and it can be lifted for introduction or removal of the saw blade 10 into or out of the rolling station 26. The rollers 34 and 36 each are surrounded by a conical ring plate 52 fastened to the roller stand 32 and the bearing body 44, respectively, in order to prevent the saw blade 10 from getting stuck at the rollers 34, 36 as it is introduced.

Both rollers 34 and 36 are adapted to be driven by way of a respective drive shaft 54 and 56, the drive shafts 54, 56 being adapted to be driven by the motor means 40 through a common worm gear 58. The pivoting motion of the second roller 36 with respect to the first roller 34 is accomplished by a motor means 60, for example a servo motor installed in the roller stand 32 and connected by a belt drive means 62 to a threaded spindle 64 which is supported in the roller stand 32. The threaded spindle 64 is arranged horizontally, spaced from the pivot axis C, perpendicular to the same and to the axis of rotation D1, and carries a threaded nut 66 which is connected by a connecting link guide 68 to a lever 70. The lever 70 extends perpendicular to the pivot axis C and is attached to the bearing body 44. The drive shaft 56 includes a stub shaft 72 in order not to obstruct the pivotal adjustability of the bearing body 44 and thus of the second roller 36 with respect to the roller stand 32. The stub shaft 72 is connected by a feather, a key 74 or the like to a sleeve 76 belonging to the second roller 36 so as to transmit torque while being axially displaceable.

The contact pressure means 38 and the two motor means 40 and 60 are controlled by a computer and control unit 78 to which all the measuring stations 22 and 28', 28", and 28'" are linked.

What is claimed is:

1. An apparatus for straightening an elongate saw blade, comprising a machine table (16) on which the saw blade (10) is movable in a direction of movement (A) which essentially conforms to its longitudinal extension, a first measuring station (22) disposed at the machine table (16) to measure the saw blade (10) in a measuring plane (B) perpendicular to the direction of movement (A) thereof, at least one second measuring station (28) disposed at the machine table (16) to scan an edge (14) of the saw blade (10) in the plane thereof transversely of the direction of movement (A), and a rolling station (26) disposed at the machine table (16) and comprising first and second rollers (34, 36) for changing the tension profile of the saw blade (10) and the curvature of the edge (14) thereof, the second roller (36) being pivotably adjustable with respect to the first roller (34) about a pivot axis (C) which intersects the axes of rotation (D1, D2) of the two rollers (34, 36) approximately at right angles and thereby adapted to be positioned obliquely for correcting distortions of the saw blade (10), characterized in that both rollers (34, 36) are pivotably adjustable in common about the pivot axis (C) and thus adapted to be positioned obliquely in accordance with measuring data supplied by the second measuring station (28) in order to correct deviations of the saw blade (10) from the direction of movement (A).

2. The apparatus as claimed in claim 1, characterized in that the two rollers (34, 36) are supported in a roller stand (32) which is pivotably adjustable about the pivot axis (C), and the second roller (36) is supported in the roller stand (32) by a bearing body (44) which is pivotably adjustable about the pivot axis (C) with respect to the roller stand and adapted to be advanced along the pivot axis to press the second roller against the saw blade (10).

3. The apparatus as claimed in claim 2, characterized in that the pivot axis (C) extends substantially along a diameter each of the two rollers (34, 36).

4. The apparatus as claimed in claim 1, characterized in that the pivot axis (C) extends substantially along a diameter each of the two rollers (34, 36).

* * * * *